United States Patent [19]

Rudolph

[11] Patent Number: 5,386,976
[45] Date of Patent: Feb. 7, 1995

[54] HYDRAULICALLY DAMPED RUBBER ENGINE MOUNT

[75] Inventor: Axel Rudolph, Bensheim, Germany

[73] Assignee: Firma Carl Freudenberg, Weinheim/Bergstr., Germany

[21] Appl. No.: 43,288

[22] Filed: Apr. 6, 1993

[30] Foreign Application Priority Data

Jul. 9, 1992 [DE] Germany .............................. 4222486

[51] Int. Cl.⁶ .............................................. F16F 13/00
[52] U.S. Cl. ............................ 267/140.12; 267/140.13; 267/219
[58] Field of Search ............ 267/140.11, 140.12, 267/219, 220, 140.13, 140.3; 248/562, 636, 638; 180/300, 312, 902

[56] References Cited

U.S. PATENT DOCUMENTS

| | | | |
|---|---|---|---|
| 4,352,487 | 10/1982 | Shtarkman | 267/140.12 X |
| 4,768,760 | 9/1988 | Le Fol | 267/140.12 |
| 4,838,529 | 6/1989 | Orikawa et al. | 267/140.12 |
| 4,840,357 | 6/1989 | Jouade | 267/140.12 |
| 5,024,425 | 6/1991 | Schwerdt | 267/141.2 X |
| 5,114,124 | 5/1992 | Muramatsu | 248/636 X |
| 5,172,893 | 12/1992 | Bouhier et al. | 267/140.12 |
| 5,181,698 | 1/1993 | Fiene et al. | 267/219 X |
| 5,199,691 | 4/1993 | Bouhier et al. | 267/140.12 |
| 5,251,884 | 10/1993 | Bouhier | 267/219 X |

FOREIGN PATENT DOCUMENTS 009120  4/1980  European Pat. Off. .

Primary Examiner—Douglas C. Butler
Attorney, Agent, or Firm—Felfe & Lynch

[57] ABSTRACT

An outer supporting body (2) surrounds an inner supporting body (1) at a radial distance therefrom, the bodies being supported on one another by a cushion (3) of rubber-elastic material which defines at least three chambers (4, 5, 6) filled with damping fluid. The first and the second chambers (4, 5) are connected to one another in a fluid-carrying manner by a connecting passage (7) and radially they at least partially surround the third chamber (6), which is defined toward the first and second chambers (4, 5) by diaphragm-like elastomeric walls.

15 Claims, 6 Drawing Sheets

HYDRAULICALLY DAMPED RUBBER ENGINE MOUNT

BACKGROUND OF THE INVENTION

The invention relates to a hydraulically damped rubber engine mount comprising an inner supporting body and an outer supporting body surrounding the inner supporting body at a radial distance therefrom. These support bodies are supported one on the other by a cushion of rubber-elastic material and define at least three chambers filled with damping fluid, the chambers being defined at least partially by inflatable rubber-elastic walls. At least two chambers are connected so that fluid can be carried from one to the other through a connecting orifice.

Such an engine mount is disclosed in EP 0 009 120. The chambers of the chamber pairs are formed by recesses in the cushion, which as manufactured are open in the radial direction and are closed when the inner supporting body including the cushion is shifted, after the chambers are filled with fluid, into an outer tube impermeable to fluid. The damping or isolation of vibration in at least two different frequency ranges is not possible with the previously known rubber bearing.

The invention is addressed to the problem of further improving a rubber engine mount of the kind described above such that vibration damping and/or vibration isolation will be produced in at least two different frequency ranges.

SUMMARY OF THE INVENTION

The first chamber and the second chamber are connected together in a fluid-carrying manner by a passage, and their elastomeric area at least partially surrounds the third chamber radially, and the third chamber is separated from the first and second chambers by diaphragm-like flexible walls. A rubber engine mount configured in this manner can be used as a torque absorbing mount for an internal combustion engine, damping on the one hand low-frequency vibrations in the 5 Hz range, for example, which are produced by load changes, and on the other hand providing good isolation of vibration due to idling. The frequency of vibrations due to idling can be, for example, in the range of 28 Hz. The first and second chambers, which are connected in a fluid-carrying manner and at least partially surround the third chamber at their elastomeric area, damp low-frequency vibrations and, at certain frequencies established by design, they lower the dynamic spring rate. The damping of low frequency vibrations will depend on the volume of the third chamber and the elasticity of the flexible walls. The isolation of high-frequency vibrations depends solely on the elasticity of the chamber walls. Except for extreme deformations, the third chamber disposed radially within the first and second chamber is excited only hydraulically at very great amplitudes, and produces a higher-frequency lowering of the dynamic spring rate and the subsequent damping. After the damping range of the first and second chamber at higher frequencies is exceeded, the fluid no longer flows through the connecting passage and virtually the entire volume of the outer chamber of higher pressure displaces the volume of the inner, third chamber between the elastomeric defining wall and the inner supporting body. On the lower-pressure side the third chamber is widened accordingly. Especially advantageous is a configuration of the connecting areas between the parts of the third chamber, which on the one hand are surrounded by the first working chamber and on the other hand by the second working chamber, as passageway. The result of this configuration is a third chamber which involves a first and a second partial chamber which are connected together by a connecting orifice. In accordance with the elasticity and the geometry of the connecting passage, this leads to frequency-dependent, contrary vibrations of the moving parts of the fluid and thus to a lowering of the dynamic spring rate. The first and the second chambers are disposed on substantially opposite sides of a common axis.

The flexible walls of the third chamber can have impact buffers reaching radially into the first chamber and/or second chamber, which in the case of extreme deflections of inner and outer supporting bodies can come in contact with the outer supporting body. In this case it is advantageous if, in the case of extreme deflections of both supporting bodies against one another, the mechanical stresses on the rubber cushion can be reduced.

To make the rubber engine mount easy to manufacture and avoid clashing noises in the case of extreme deflection of the two supporting bodies, the flexible walls and the buffers can be combined integrally with one another.

The buffers can have in the area of their impact areas depressions on the side facing the outer supporting body, which will define a cavity when the buffers come into contact with the outer supporting body. The end-position damping thus achieved additionally reduces the mechanical stresses and any noise that might be created.

To achieve useful dynamic characteristics, the first and second chamber can each terminate at both ends in flexible walls having the same bulging elasticity. To obtain different working characteristics of the rubber engine mount when tensile and compressive stresses are applied, the flexible walls of the first chamber can have an overall bulging elasticity that differs from the overall bulging elasticity of the walls of the second chamber. For many applications such dynamic characteristics are advantageous.

In addition to an exclusive connection between the first and second chambers, the third chamber can also be connected in a fluid-carrying manner by an additional orifice to one of the two chambers that surround it. In this case it is advantageous that the rubber engine mount is easier to fill with damping fluid, thereby simplifying assembly.

In their elastic area the flexible walls of the third chamber can surround the inner supporting body in at least part of its axial length, at a radial distance away from it, and have a raised pattern on the inside surface facing the inner supporting body. A raised pattern on the corresponding surface of the inner supporting body is also possible. If the buffer collides with the outer support body, the passages which are provided between the inner supporting body and the radial defining wall of the third chamber produce an end position damping by the movement of the fluid in itself. In addition, these passages define the upper limit (end position) of the amplitudes to be isolated, because when the flexible walls collide with the inner supporting body the dynamic spring rate increases. For example, there is the possibility of limiting the passages with an insert that is disposed radially between the elastically yielding area of the third chamber and the unyielding area of the inner supporting body. The fluid displacement takes place in the case of a fully closed third chamber, wherein the fluid portion in the sections of higher pressure are displaced into the sections of lower pressure. In the case of a fully closed third chamber, to improve the tuning of the hydraulically damping engine mount, it is possible to use damping fluids of different viscosity. If it is desired to strongly damp the movement at maximum relative displacement of the first and second bodies (end position) the fully closed third chamber should be filled with a relatively viscous damping fluid, while the damping fluid in the first and second chamber is thinner. The connection of the first and second partial chambers within the third chamber can be formed in a cover which seals the engine mount from the environment. When the third chamber is connected to one of the two chambers adjacent one another radially, the damping fluid has the same viscosity, because an exchange of fluid can take place among all of the chambers.

For the sake of ease in filling the rubber mount with damping fluid, the mount can be made symmetrical with an imaginary radial plane. In this case it is advantageous that the inner supporting body and the cushion adhesively surrounding the inner supporting body are made bipartite in the axial direction, the inner supporting bodies being joined together frictionally and/or positively by connecting means such as a snap ring. The inner supporting body sections may have, in the area of the confronting axial contact surfaces, recesses into which the connecting means can be inserted such that the result is a continuous, smooth inside surface of a tubular inner supporting body. A fluid-tight connection must be assured along the planes of separation.

According to another embodiment, the third chamber can be formed of a recess in the cushion that is open in the axial direction, and which is closed with a cover after the rubber mount has been filled with fluid. The inner supporting body in this example is formed by a holder which extends axially into the third chamber and is surrounded only axially on the one hand by the cushion.

DETAILED DESCRIPTION OF THE PREFERRED EMBODIMENT

Figure 1:
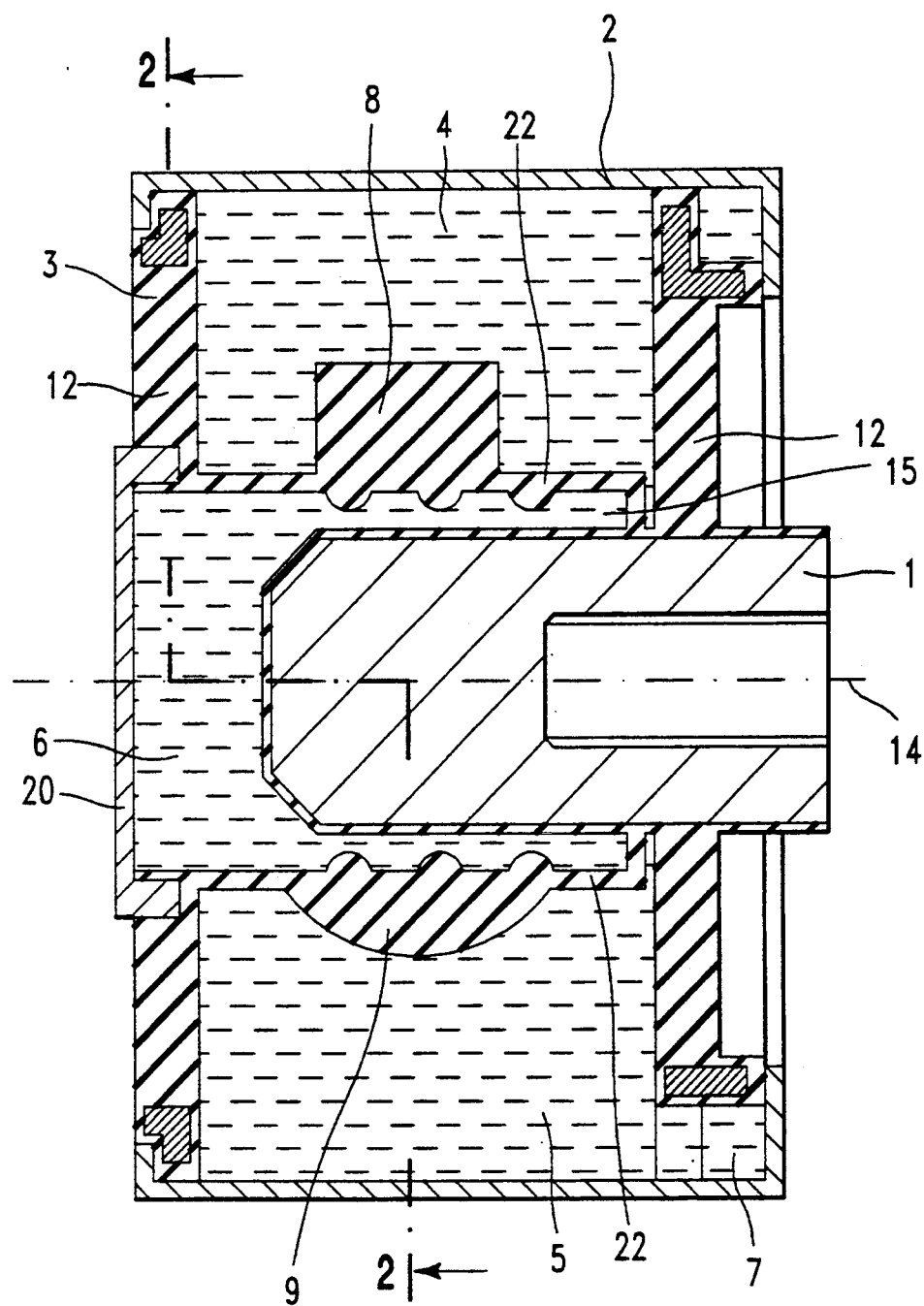
FIG. 1 shows an embodiment of a rubber engine mount in a longitudinal section along line 1—1 of FIG. 2.
Figure 2:
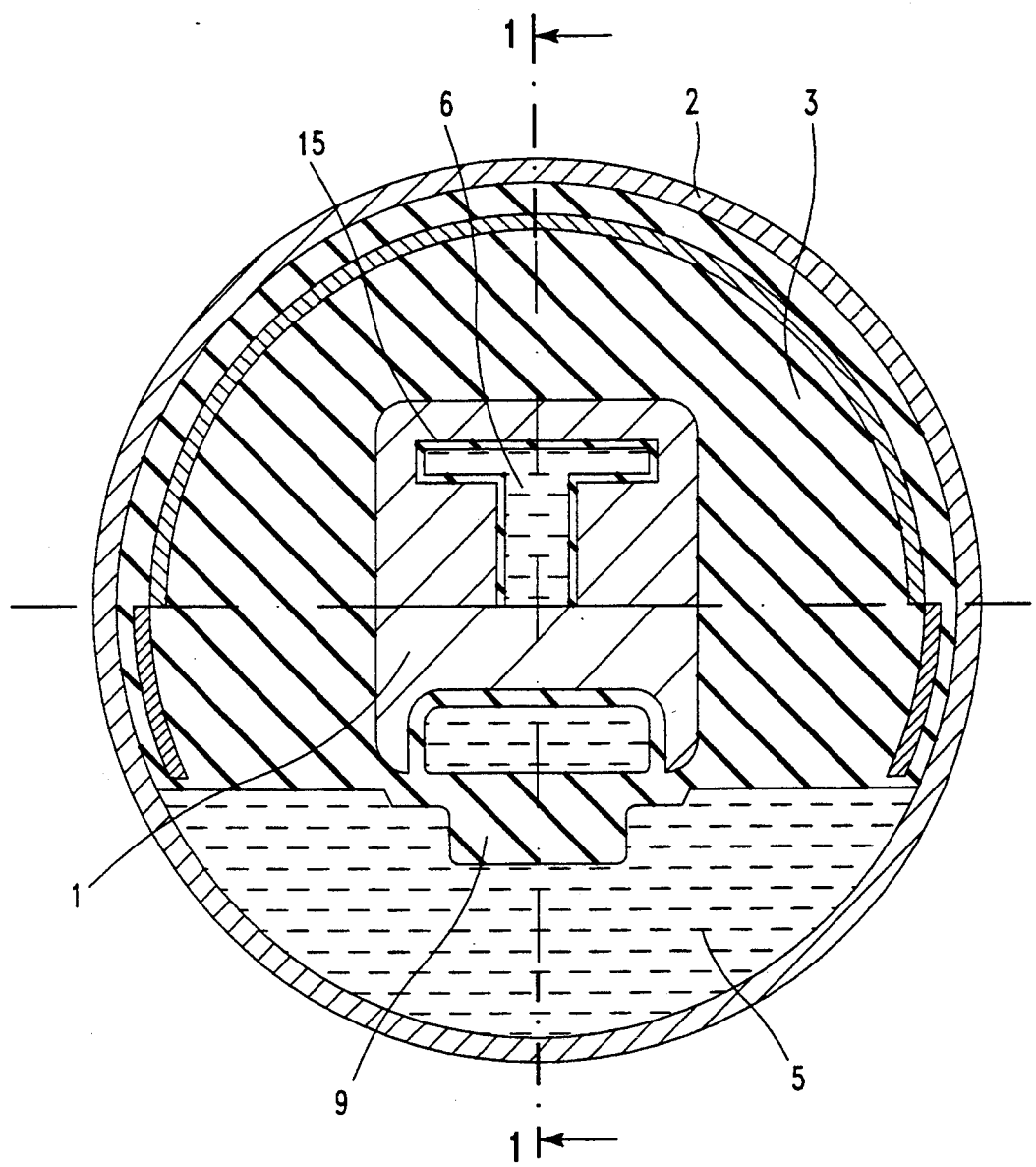
FIG. 2 is a cross section taken along line 2—2 of FIG. 1.

In FIGS. 1 to 4, two embodiments of a rubber mount according to the invention are shown. In FIGS. 1 and 2 an inner support body 1 and an outer support body 2 are supported one on the other by a cushion 3 made of a rubber-elastic material. The rubber mount in both embodiments includes three chambers 4, 5 and 6, which are filled with damping fluid. The first chamber 4 is connected with the second chamber 5 by a passage 7 which extends around 180 degrees of the circumference in order to provide a large mass of moving liquid for damping low frequency vibrations. In the case of the embodiment represented in FIGS. 3 and 4 the first chamber 34 is connected to the second chamber 35 by two passages 37.

Figure 1A:
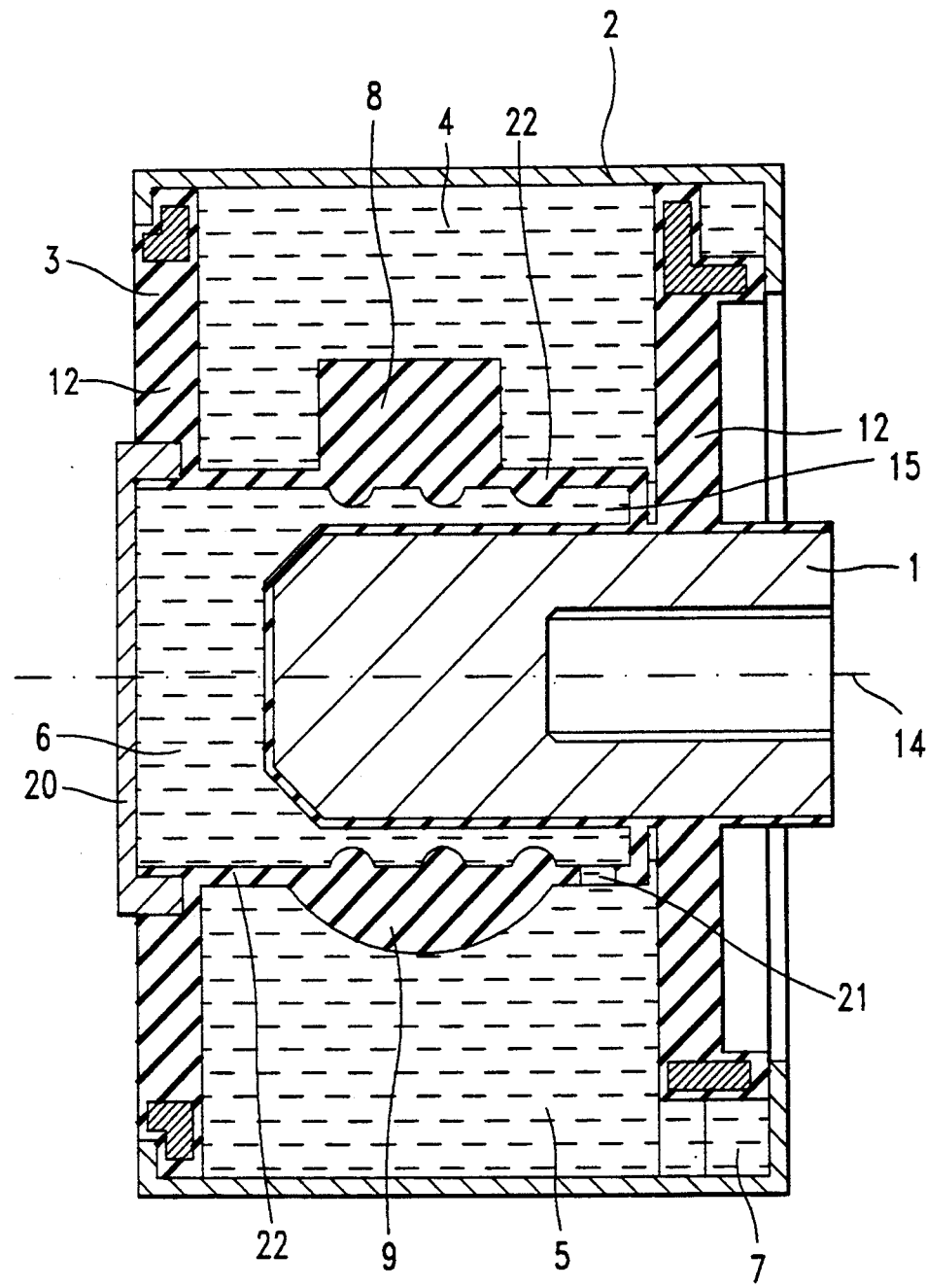
FIG. 1a is similar to FIG. 1 but shows an aperture connecting the second chamber to the third chamber.
Figure 3:
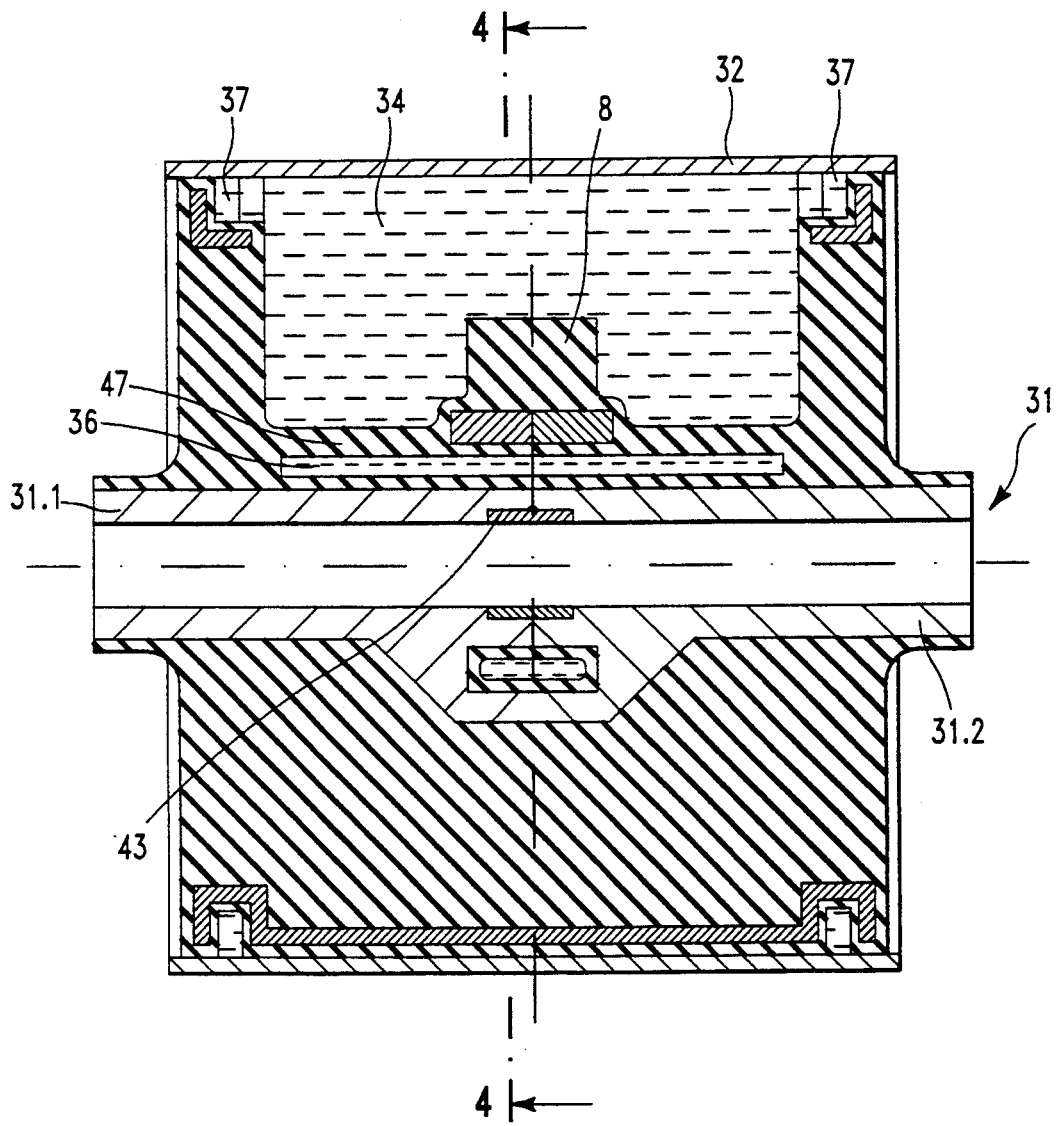
FIG. 3 shows an additional embodiment of the rubber engine mount, in a longitudinal section taken along line 3—3 of FIG. 4, the mount being made bipartite in the axial direction.
Figure 4:
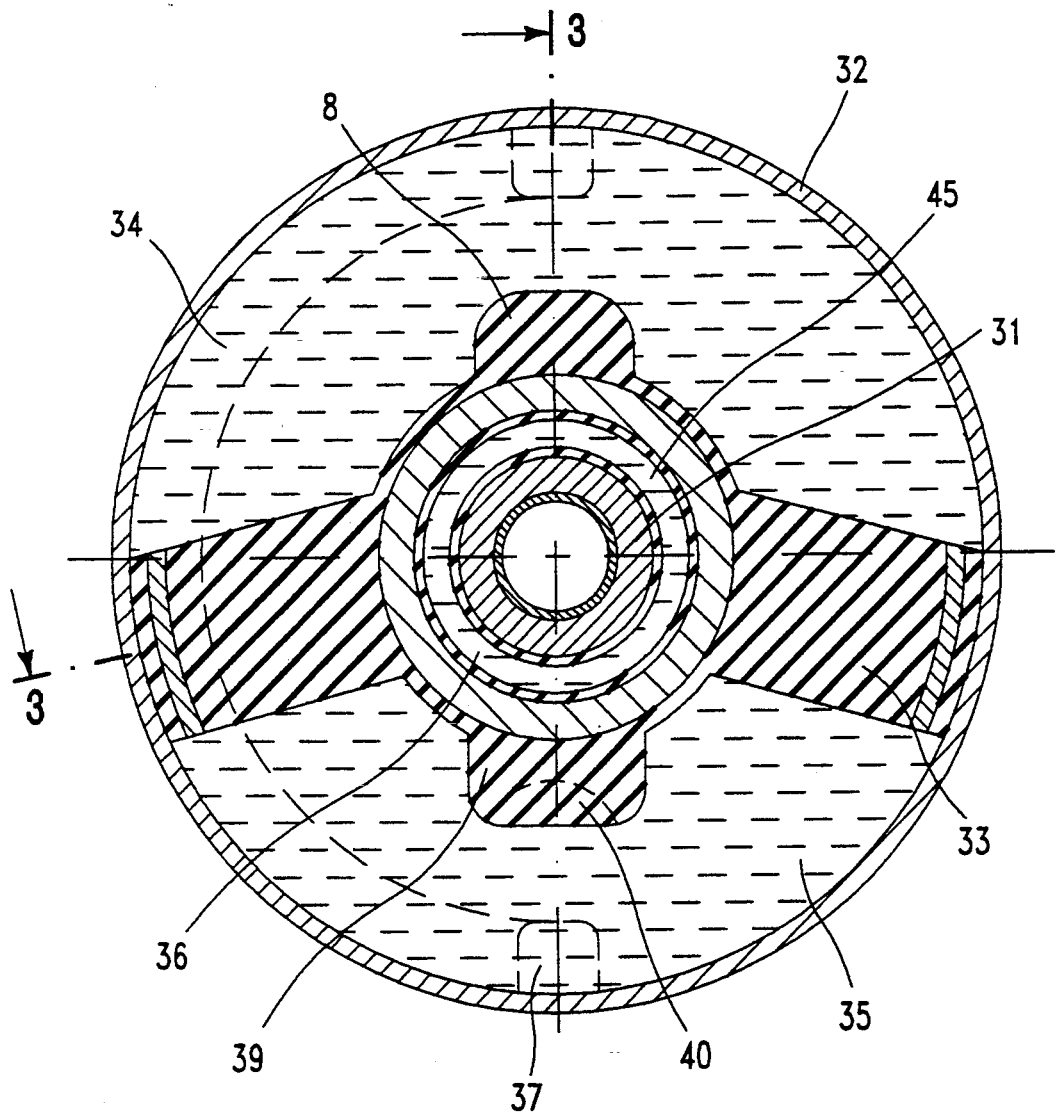
FIG. 4 is a cross section taken along the line 4—4 of FIG. 3.

The first and second chambers 4 and 5 are disposed substantially on opposite sides of a common axis 14 and surround the third chamber 6 circumferentially at their resiliently yielding areas. The third chamber 6 is separated from the first and second chambers 4 and 5 by thin, diaphragm-like, elastomeric walls 22 which run only circumferentially. The axial boundary of the third chamber 6 can be considered essentially as unyielding, as can be seen in FIGS. 1 and 3. In FIG. 1 the third chamber 6 terminates axially in a cover 20 which closes the axial opening of the rubber cushion 3. In this embodiment, the third chamber 6 is not in fluid-carrying communication with the first and second chambers 4 and 5. In another variant, shown in FIG. 1A, the third chamber 6 can have in its radial boundary on the circumference side at least one opening 21 which is in fluid-carrying communication with the second chamber 5. The passages 15 defining the radial distance between the diaphragm-like, elastomeric wall 22 of the third chamber 6 and the inner supporting body 1 can be adapted to the circumstances of the particular situation. The third chamber 6 in the embodiment according to FIGS. 1 and 2 is of a double T-shape cross-section, while the third chamber 36 in FIGS. 3 and 4 is of annular cross-section.

The hydraulically damping rubber engine mounts shown in FIGS. 1 to 3 damp low-frequency vibrations in at least two different frequency ranges and have a low dynamic spring rate in these frequency ranges. The first frequency range lies for example at 5 Hz. A typical application for this is, for example, a mount for the purpose of damping abrupt alternating changes in the load torque of an internal combustion engine. The damping of these load torque shifts is performed by the shifting of damping fluid between the first chamber 4 and the second chamber 5 through the passage 7, and in the case of great vibration amplitudes by the striking of the buffers 8 and 9 against the outer supporting body 2. In this case parts of the damping fluid are displaced from a portion of higher pressure within the third chamber 6 into a portion of lower pressure.

The second frequency range in which vibrations created by engine operation can be damped is shifted toward higher frequencies and these are damped by fluid displacement within the third chamber. Extreme movements do not take place, so that the buffers 8 and 9 do not come in contact with the outer supporting body 2.

For the good isolation of higher-frequency vibrations, as for example vibrations occurring while an engine is idling, which are in the 28 Hz range, the vibrations are isolated exclusively through the elastomeric end walls of the first and second chambers 5 and 6. No fluid displacement between chambers 5 and 6 takes place.

Unlike the embodiment in FIGS. 1 and 2, the engine mount in FIGS. 3 and 4 is made axially bipartite. The two halves 31.1, 31.2 of the inner supporting body 31 are joined to the bipartite cushion 33 with an adhesive. The engine mount is composed of two identical vulcanized parts 33, an outer tube 32, and a coupling 43, the coupling 43 being constituted by a snap ring which, in conjunction with the one-piece outer supporting body 32, reliably locks the two inner supporting body parts 31.1 and 37.2 against one another axially. On the basis of their simple, symmetrical shape, the production of the components used in accordance with FIGS. 3 and 4 is especially advantageous from the economic point of view. The sealing of the third chamber 36 from chambers 34 and 35 can be accomplished by means of an adhesive. It is also possible to displace the inner supporting body 31 toward the outer supporting body 32, so that after the load to be borne according to specifications is applied, it will assume a predetermined working position. To achieve different expansion and compression stages, the elastomeric walls 47 of the first and second chambers 34 and 35 can have different bulging elasticities. This is advantageous in many applications. Buffers 38, 39 are provided to damp large amplitude vibrations.

Figure 5:
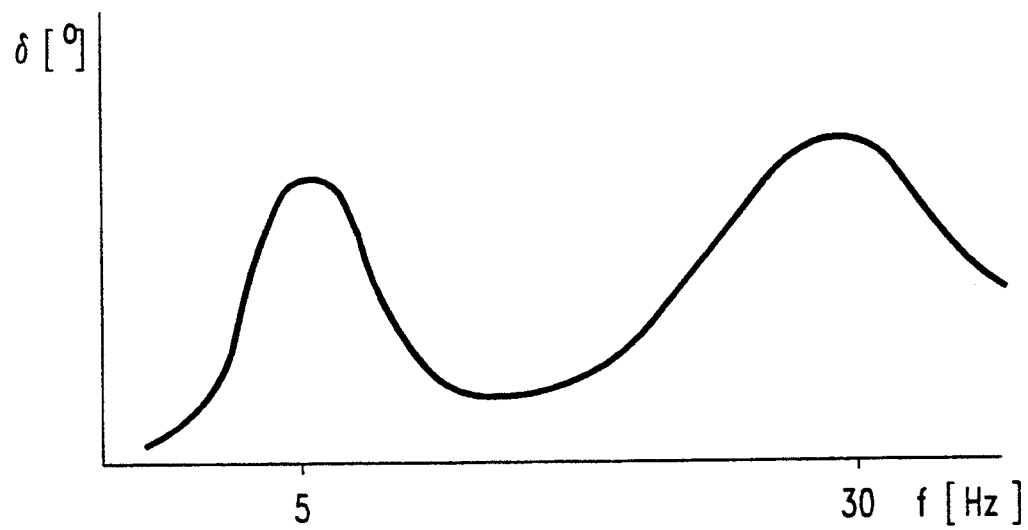
FIG. 5 is a characteristic curve plotting damping angle versus frequency of vibration.
Figure 6:
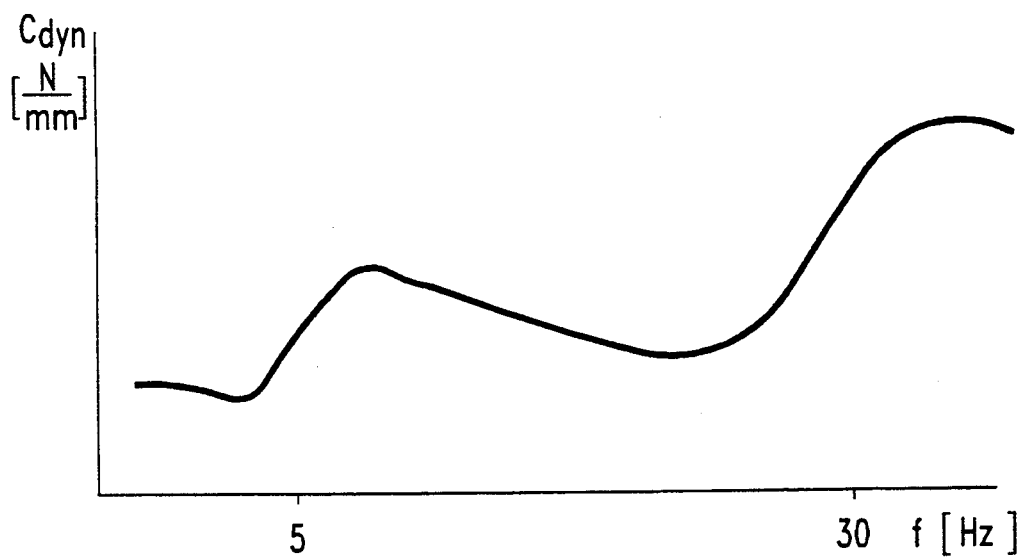
FIG. 6 is a characteristic curve plotting dynamic spring rate versus frequency of vibration.

In FIGS. 5 and 6 the characteristic of the rubber mount of FIGS. 1 to 4 is represented graphically. In FIG. 5 the damping angle δ is plotted in degrees over the frequency in Herz. In FIG. 6 the dynamic spring rate $c_{dyn}$ in N/mm is also plotted over the frequency in Herz. It can easily be seen that there is a first damping maximum in the range of 5 Hz and a second damping maximum at about 28 Hz. The damping of the low-frequency vibration at 5 Hz is provided for damping abrupt load changes. The vibrations in the 28 Hz range due to idling are isolated by the second maximum.

As can be seen in FIG. 6, the increase in damping is accompanied by a lowering of the dynamic spring rate. This is advantageous for the purpose of isolating vibrations due to idling with the greatest possible flexibility.

Characteristics which differ from the ones shown here can be achieved by modifying the viscosity of the damping fluid. Different configurations of the chamber walls, the use of a different elastomer, or a hydraulic connecting passage of another geometrical shape, will also affect the characteristics, so that the rubber engine mount can be adapted to a particular application.

The rubber engine mount according to the invention has good practical properties with two damping peaks in different frequency ranges, and at least one frequency range with a low dynamic spring rate. The rubber bearing according to the invention is easy to manufacture and offers good performance over a long period of time.

What is claimed is:

1. Hydraulically damping engine mount comprising
    an inner support body having a central axis,
    an outer support body surrounding said inner support body and spaced radially from said inner support body,
    an elastomeric wall surrounding said inner support body between said inner support body and said outer support body,
    a first chamber on one side of said axis between said elastomeric wall and said outer support body, said first chamber being bounded by said elastomeric wall and said outer support body,
    a second chamber between said elastomeric wall and said outer support body opposite said axis from said first chamber, said second chamber being bounded elastomeric wall and said outer support body,
    a third chamber between said elastomeric wall and said inner support body, said elastomeric wall bounding said third chamber and serving as a flexible diaphragm separating said first chamber from said third chamber, and as a flexible diaphragm separating said second chamber from said third chamber.
    damping fluid in said first, second, and third chambers, and
    passage means connecting said first and second chambers to permit fluid transfer between said first and second chambers, said passage means being separate and distinct from said third chamber.

2. Hydraulically damping engine mount as in claim 1 further comprising abutment buffer means extending from said elastomeric wall into at least one of said first and second chambers so that said buffer means contacts said outer support body to limit displacement of said first body relative to said second body.

3. Hydraulically damping engine mount as in claim 2 wherein said buffer means is formed integrally with said elastomeric wall.

4. Hydraulically damping engine mount as in claim 3 wherein said buffer means is formed with indentation means facing said outer support body, thereby providing additional damping as said buffer means contacts said outer support body.

5. Hydraulically damping engine mount as in claim 1 wherein each first and second chamber is bounded by axially opposed end walls of like elasticity.

6. Hydraulically damping engine mount as in claim 1 wherein each first and second chamber is bounded by axially opposed end walls, the total elasticity of the end walls of the first chamber differing from the total elasticity of the end walls of the second chamber.

7. Hydraulically damping engine mount as in claim 1 wherein said third chamber is bounded by axially opposed end walls which are substantially rigid.

8. Hydraulically damping engine mount as in claim 1 wherein said third chamber is hydraulically isolated from said first and second chambers.

9. Hydraulically damping engine mount as in claim 1 wherein said elastomeric wall is provided with indentation means facing said inner support body.

10. Hydraulically damping engine mount as in claim 1 wherein said inner support body and said elastomeric wall each comprise two axial sections having contact surfaces which are connected together.

11. Hydraulically damping engine mount as in claim 10 further comprising a ring which fits into said two sections of said inner support body.

12. Hydraulically damping engine mount as in claim 1 wherein said passage means comprises at least one passage adjacent said outer support body, said passage having a first orifice communicating with said first chamber and a second orifice communicating with said second chamber.

13. Hydraulically damping engine mount as in claim 12 wherein said first and second orifices are 180 degrees apart relative to said axis.

14. Hydraulically damping engine mount as in claim 12 comprising two said passages at axially opposed ends of said outer support body.

15. Hydraulically damping engine mount as in claim 1 wherein said third chamber is hydraulically isolated from said first and second chambers, said damping fluid in said third chamber having a higher viscosity than the damping fluid in the first and second chambers.

* * * * *